(12) United States Patent
Corcoran et al.

(10) Patent No.: US 7,939,774 B2
(45) Date of Patent: May 10, 2011

(54) TUNABLE KEYS FOR A CONTROL DEVICE

(75) Inventors: Fergal Corcoran, Ennis (IE); Martin Gleeson, Knockraha Village (IE); Christian Blandin, Ballincollig (IE); Denis O'Keeffe, Newmarket (IE); Neil O'Connell, Cork City (IE); Kevin Forde, Cork City (IE)

(73) Assignee: Logitech Europe S.A., Morges (CH)

( * ) Notice: Subject to any disclaimer, the term of this patent is extended or adjusted under 35 U.S.C. 154(b) by 386 days.

(21) Appl. No.: 11/705,917

(22) Filed: Feb. 13, 2007

(65) Prior Publication Data
US 2007/0251810 A1 Nov. 1, 2007

Related U.S. Application Data

(60) Provisional application No. 60/773,985, filed on Feb. 15, 2006.

(51) Int. Cl.
*H01H 3/00* (2006.01)
(52) U.S. Cl. .................................. 200/329; 345/163
(58) Field of Classification Search .......... 200/504–517, 200/520–535, 341–345, 329–333; 345/156–163
See application file for complete search history.

(56) References Cited

U.S. PATENT DOCUMENTS

| | | | |
|---|---|---|---|
| 4,166,994 A * | 9/1979 | DeRemer | 337/350 |
| 4,899,631 A | 2/1990 | Baker | |
| 5,220,318 A | 6/1993 | Staley | |
| 5,879,088 A | 3/1999 | English | |
| 5,929,407 A * | 7/1999 | Ziem | 200/61.89 |
| 6,198,473 B1 | 3/2001 | Armstrong | |
| 6,879,316 B2 | 4/2005 | Kehlstadt et al. | |
| 6,933,925 B1 * | 8/2005 | Gibbons et al. | 345/163 |
| 6,952,528 B2 * | 10/2005 | Robins et al. | 396/263 |

FOREIGN PATENT DOCUMENTS

| | | |
|---|---|---|
| DE | 20109325 U1 | 10/2001 |
| DE | 102004036783 A1 | 7/2005 |
| EP | 0757327 A2 | 2/1997 |
| WO | WO 2005074435 A2 | 8/2005 |

OTHER PUBLICATIONS

German Examination Report for Application No. 102007007531.8 mailed on Apr. 28, 2008; 8 pages.
Chinese Office Action for Application for 200710005985.7 mailed on May 30, 2008; 6 pages.
Chinese Office Action for Application for 200710005985.7 mailed on May 8, 2009; 3 pages.

* cited by examiner

*Primary Examiner* — Renee Luebke
*Assistant Examiner* — Marina Fishman
(74) *Attorney, Agent, or Firm* — Kilpatrick Townsend & Stockton LLP

(57) ABSTRACT

A control device for use on a working surface includes a bottom housing configured to be placed on the working surface; a top housing coupled with the bottom housing, the top housing including at least one key; an actuator disposed between the bottom housing and the top housing and coupled with the key; a switch disposed between the bottom housing and the top housing, wherein the switch is activated via application of an actuation force to the key; and an adjustment means configured to enable a user to adjust the actuation force required to activate the key.

6 Claims, 11 Drawing Sheets

TUNABLE KEYS FOR A CONTROL DEVICE

CROSS REFERENCE TO RELATED APPLICATIONS

This application claims priority to U.S. Provisional Patent Application No. 60/773,985, filed Feb. 15, 2006, titled "Tunable Keys for a Control Device," and which is incorporated by reference herein in its entirety for all purposes.

BACKGROUND OF THE INVENTION

The present invention generally relates to control devices, such as a mouse, a trackball, and a keyboard. Control devices typically have one or more keys that a user can manually depress to activate specific functions of a computer program.

The user's finger typically applies a downward activation force on a key of the control device to activate the key. However, the user may desire a different actuation force for the key to increase her comfortable use of the control device. That is, some users may benefit from keys with a lower actuation force (or lower stiffness) while other users may prefer keys having a larger actuation force (or higher stiffness). Additionally, a user may prefer to adjust the activating force for one key to be different from the activating force for another key on the same control device.

A user may have other individual preferences for the actuation of the keys of a control device. For example, a user may desire a different key travel or time for a key to activate. Some users may prefer relatively short key travel and fast activation for relatively fast response of the control device, whereas other user may prefer longer key travel and relatively slower activation of the control device. Control devices having keys that have relatively long keystroke travel may prevent unintended actuation of keys when inadvertently tapped or bumped.

Mechanisms that permit a user to adjust the actuation force of the keyboards keys are described in U.S. Pat. No. 5,879,088 and U.S. Pat. No. 5,220,318. U.S. Pat. No. 6,952,528 describes a mechanism that allows a user to adjust the force to activate the shutter release button of a camera. U.S. Pat. No. 4,899,631 describes a mechanism that allows a user to adjust the force to activate the keys of electronic musical instruments, such as electronic pianos.

Some control devices with scrolling elements have included force-dependent inputs. For example, U.S. Pat. No. 6,198,473 and U.S. Pat. No. 6,879,316 describe input devices with force-dependent keys that allow the speed of scrolling to be controlled dependent on the force applied to the keys. However, the above control devices focus on variations in functions enabled by adjustments in pressure on the key during the operation of a control device.

Accordingly, new devices are needed that permit users to adjust the key's preset, initial stiffness, or the actuation force required to activate the key.

BRIEF SUMMARY OF THE INVENTION

The present invention generally provides a control device, such as a mouse, and more particularly provides a control device with tunable keys.

According to one embodiment of the invention, the control device includes a bottom housing configured to be placed on a work surface; a top housing coupled with the bottom housing, the top housing including at least one key; an actuator disposed between the bottom housing and the top housing and coupled with the key; a switch disposed between the bottom housing and the top housing, wherein the switch is activated via application of an actuation force to the key; and an adjustment means configured to enable a user to adjust the actuation force required to activate the key.

According to a specific embodiment, the adjustment means on the control device includes a spring configured to apply an adjustment force to the key that increases or decreases the actuation force of the key. According to another specific embodiment, the adjustment means includes a slider coupled to the spring and configured to bias the spring to change the actuation force. According to another specific embodiment, the adjustment means on the control device includes a movable weight slide-ably coupled to the key. According to another specific embodiment, the adjustment means on the control device includes a braking device.

According to one embodiment of the invention, the control device includes a bottom housing configured to be placed on the working surface; a top housing coupled with the bottom housing, the top housing including at least one key; a first magnet near an actuator, the first magnet having a first magnetic field with a first polarity; a second magnet near a switch, the second magnet having a second magnetic field with a second polarity opposite to the first polarity; wherein the switch is activated via application of an actuation force to the key; and the actuation force varies with the difference between the first and second magnetic fields.

According to one embodiment of the invention, the control device includes a bottom housing configured to be placed on the working surface; a top housing coupled with the bottom housing, the top housing including at least one key; an actuator disposed between the bottom housing and the top housing and coupled with the key; a switch disposed between the bottom housing and the top housing, wherein the switch is activated via the actuator traveling a distance to engage the switch; and an adjustment means to enable a user to adjust the distance between the actuator and the switch. In a specific embodiment, the adjustment means includes a screw type device. In another specific embodiment, the adjustment means includes a cam.

According to one embodiment of the invention, the control device includes a bottom housing configured to be placed on the working surface; a top housing coupled with the bottom housing, wherein a part of the top housing is coupled with at least one actuator, the actuator having a first adjustable height; and a switch disposed between the bottom housing and the top housing, wherein the switch is activated via the actuator traveling a distance to engage the switch; wherein the part of the top housing coupled with the actuator is removable to enable a user to change the height of the actuator. In a specific embodiment, the first actuator is replaced by a second actuator having a second height different than the first height.

A better understanding of the present invention may be gained with reference to the following detailed description and accompanying figures.

DETAILED DESCRIPTION OF THE INVENTION

The present invention generally provides a control device, such as a mouse or a trackball, having tunable keys that a user can adjust to vary the activation force and/or the travel of the keys.

Figure 1A:
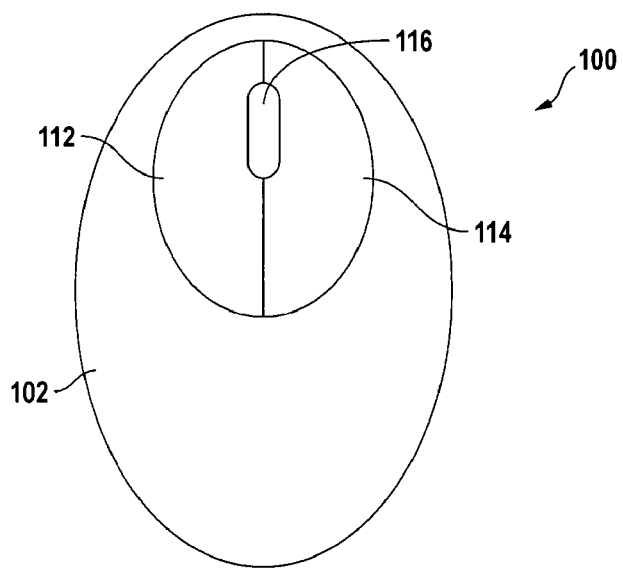
FIGS. 1A and 1B are top and cross-sectional views of a mouse according to one embodiment of the invention.
Figure 1B:
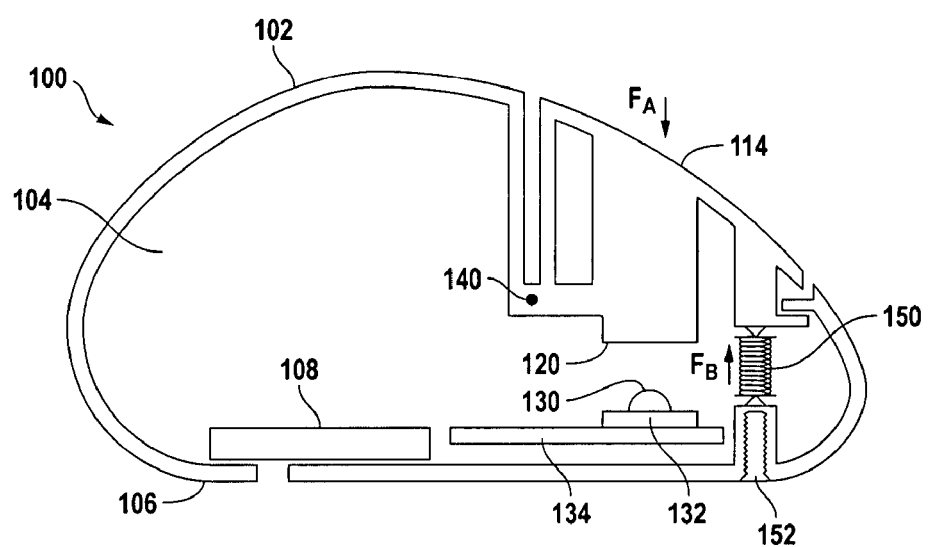

FIGS. 1A and 1B are top and cross-sectional views of a mouse 100 according to one embodiment of the invention. Mouse 100 includes a top housing 102 and a bottom housing 106. The top housing includes keys 112 and 114, and a scroll wheel 116. Mouse 100 may also include a tracking device 108 that is configured to track and encode the movement of the mouse relative to a work surface. The tracking device may include an optical device or the like, such as an LED or a laser and a detector configured to detect the radiation from these sources. The tracking device might alternatively include a roller ball or other tracking devices in use at the time. Tracking devices such as those described are well known in the art and will not be described in further detail herein.

The keys may be curved downward from back to front to follow the shape of the top housing. According to one embodiment, each key is configured to be pressed downward, and to pivot about a hinge 140. While hinge 140 is shown as disposed at a bottom portion of the key, the hinge may be at an upper portion of the key, for example to provide a relatively seamless top appearance of the top housing. Each key includes an actuator 120 that is configured to be moved down as its associated key is pressed to activate an associated switch 130. Switch 130 may be an electromechanical switch, a solid state switch or the like. The switch may be coupled to a printed circuit board 134 that may be powered by a power source (not shown). The printed circuit board may further include a processor, a memory and the like (not shown). Activation of switch 130 configures the mouse to send control commands to a computer and perform various control functions on a program running on the computer. Such control functions may include selecting and/or manipulating a graphical object or the like that may be displayed on the computer's display device. Graphical object as referred to herein may include text, images, data and the like.

Several embodiments are described herein for adjusting the keys of the control device according to a user's individual needs and comfort. When a user manually depresses a key, a force $F_A$ is applied downward on the key. When force $F_A$ is sufficient, actuator 120 activates switch 130. The force that is required for actuator 120 to activate switch 130 is referred to as the "actuation force" of a key. Factors that effect the actuation force of the keys include, the resistive force from the key and the resistance force of the switch, which is sometimes referred to herein as a "click" force and provides tactile and possibly audible feedback to the user to indicate that the switch has been activated.

According to one embodiment of the present invention, the actuation forces of the keys are adjustable. These tunable actuation forces enable a user to adjust the stiffness of the keys for reasons related to finger strength, fatigue, comfort or the like. For example, the adjustable device in the embodiment of FIG. 1B is an adjustable spring 150 coupled to the key and is configured to provide an adjustable upward force $F_B$ that counters the downward force $F_A$ applied by the user.

According to another embodiment of the present invention, the actuation of the keys may be adjusted instead by changing the distance the keys travel downward for the actuators to activate their associated switches. These embodiments include adjustable devices that are configured to adjust (or tune) the travel distances of the keys and more specifically tune the distances between the actuators and their associated switches. Tunable travel mechanisms may serve users who prefer swift control movements, by lightly tapping on the keys of a control device, but also those users who prefer the security of a long actuation depth before any functions are performed. Embodiments for both tunable force keys and tunable travel keys are presently described in further detail.

1. Tunable Forces

A typical value for the actuation force for a key of a conventional control device is about 60 grams of force (gf), within a range of ±15 gf. Embodiments of the invention provide a range of user selectable actuation forces from about 30 gf to about 200 gf. Various adjustable devices in various mouse embodiments are configured to provide tunable keys and are typically accessible to the user by various controls on the exterior surface of the mouse.

Embodiments of the invention that include keys having tunable actuation forces permit a user to reduce or increase the actuation forces. According to a specific embodiment of the invention, no residual stresses are exerted on the keys whether the actuation forces are adjusted upward by the user or downward. If no residual stress is placed on the keys, creep from the material (e.g., plastic, metal, etc.) that the keys are fabricated from is limited.

According to the embodiment of FIG. 1B, spring 150 may be compressed or extended via a screw device 152 that may be accessible to the user from the bottom housing of the mouse. The screw may be moved "up," for example, by being rotated to compress the spring to increase the upward force exerted by the screw on the spring, which increases the downward force a user must apply to the key for the actuator to activate the switch. The screw may be moved "down" to permit the spring to elongate, which decreases the downward force a user must apply to the key for the actuator to activate the switch.

Figure 2:
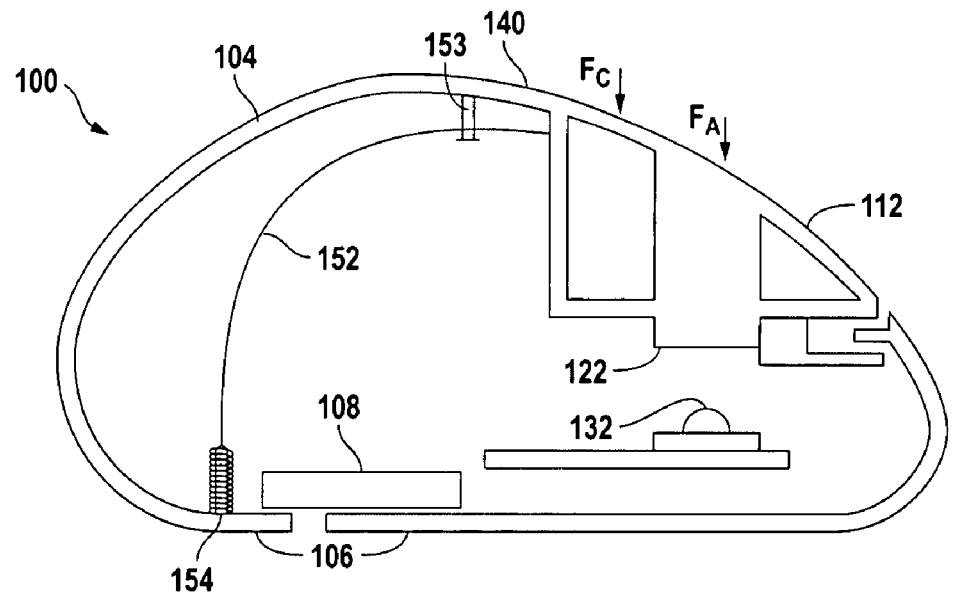
FIG. 2 is a simplified cross-section view of a mouse having a tunable key according to another embodiment of the invention.

FIG. 2 is a simplified cross-section view of a mouse having a tunable key according to another embodiment of the invention. The mouse includes a spring 152 mounted on the inside of the housing and coupled to key 114. The spring plate is coupled to a pivot 153 and a screw device 154. The screw is configured to be turned to move the base of the spring up or down to add tension to or remove tension-from the spring. Screwing the screw up lowers the force the user must apply to the key to activate switch 130. Screwing the screw down increases the force the user must apply to the key to activate the switch. While device 154 is described as being a screw type device, device 154 may be nearly any type of device for adding or removing tension from the spring.

Figure 3:
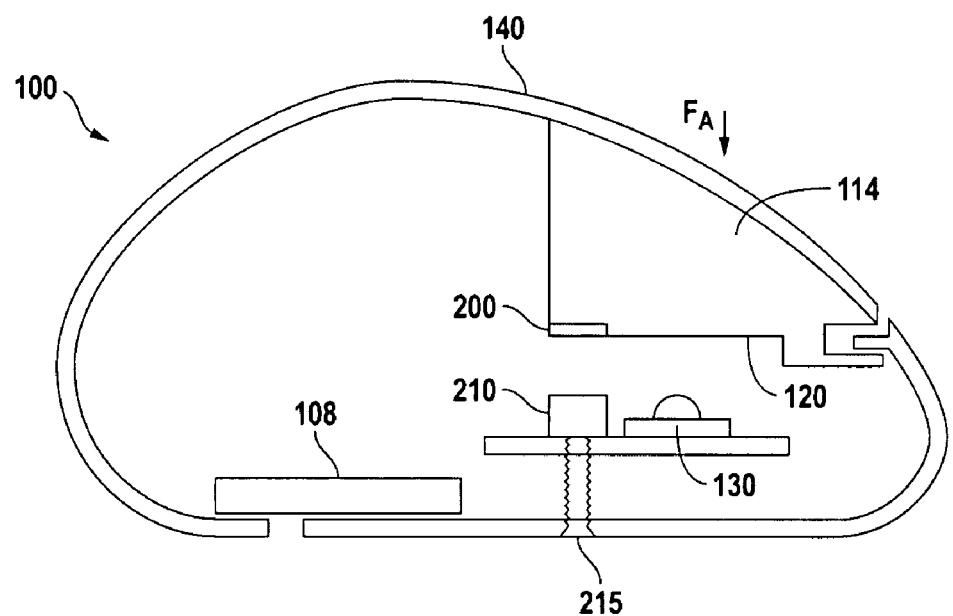
FIG. 3 is a simplified cross-sectional view of mouse according to another embodiment of the invention

FIG. 3 is a simplified cross-sectional view of mouse according to another embodiment of the invention. The mouse includes magnets 200 and 210 that are configured to change the actuation force needed to press the key to activate switch 130. Specifically, magnet 200 is coupled to actuator 120, and magnet 210 is coupled to switch 130, for example via the PC board. Magnet 210 is configured to be rotated by rotation device 215 to align or de-align the poles of the magnets to change the magnetic attraction or repulsion between the magnets. Substantially aligning like poles of the magnets increases the repulsion force between the magnets and increases the actuation force necessary to press key 114 to activate switch 130. De-aligning the like poles and/or substantially aligning unlike poles increases the attractive force between the magnets and decreases the actuation force necessary to press key 114 to activate switch 130. While magnets 200 and 210 are described above as being fixed magnets, one or more of these magnets may be electromagnets.

Figure 4:
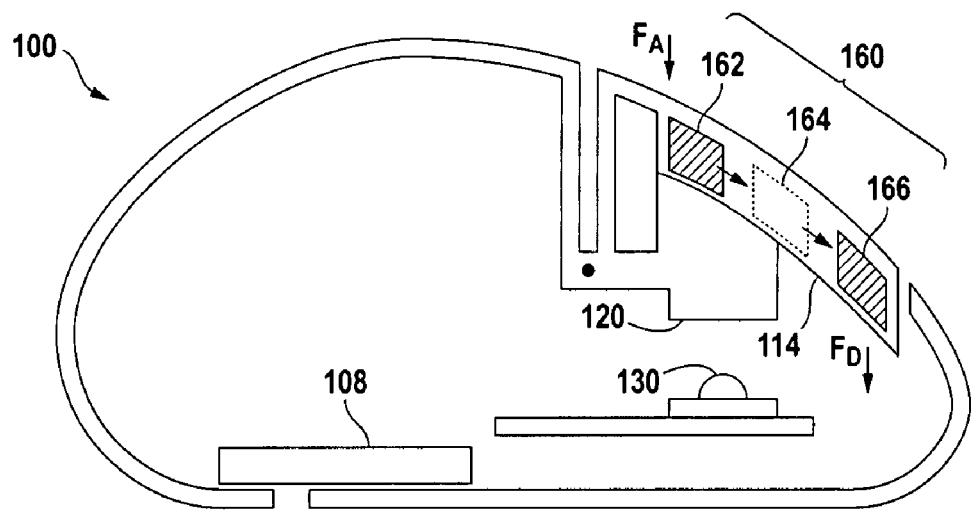
FIG. 4 is a simplified cross-sectional view of a mouse that includes a weight that is slide-ably coupled to a key.

In another embodiment of the invention, weights may be used as the adjustable device configured to adjust the actuation force required press key 114 to activate switch 130. FIG. 4 is a simplified cross-sectional view of a mouse that includes a weight 160 that is slideably coupled to key 114. Weight 160 provides a downward force $F_D$ in the direction of the force $F_A$ applied to key 114 by a user. Weight 160 may be moved to different positions on key 114 to adjust the actuation force of the key. The actuation force may be increased by sliding the weight toward the back (e.g., toward position 162) of the key and may be decreased by sliding the weight toward the front (e.g., toward position 166) of the key. According to some embodiments, weight 160 may also be moved left and right (into or out from the plane of the page) to change the center of gravity of the mouse.

Figure 5:
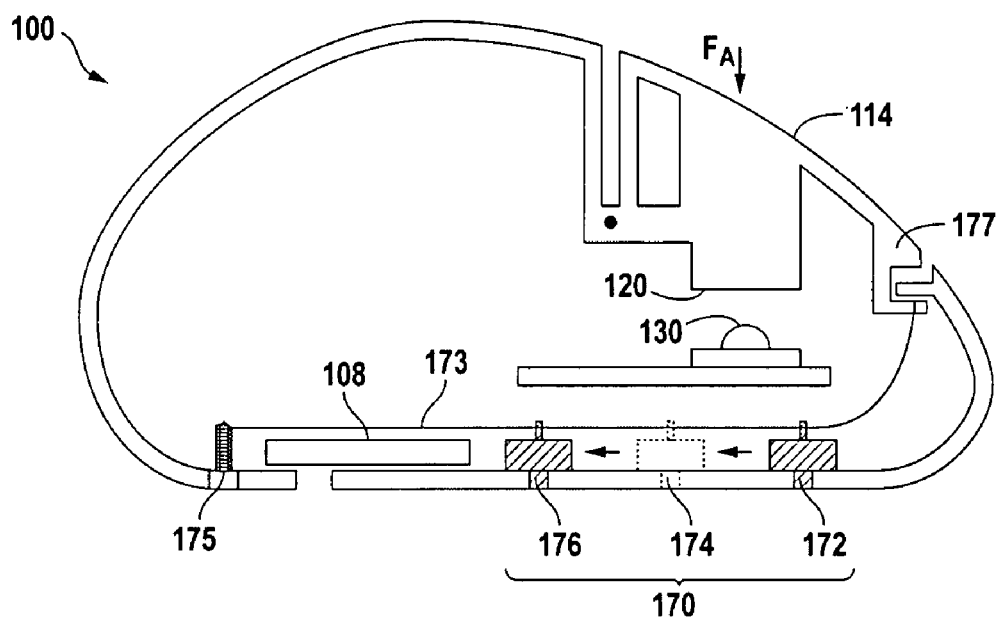
FIG. 5 is a simplified cross-sectional view of a mouse according to another embodiment of the invention.

FIG. 5 is a simplified cross-sectional view of a mouse according to another embodiment of the invention. The mouse includes a slider 170 that is configured to apply a tunable force to a spring 173. Slider 170 may be moved toward a back mount 175 (e.g., toward position 176) so that spring 173 applies a relatively large upward force on key 114, and may be moved away from the back mount (e.g., toward position 172) so that spring 173 applies a relatively lower upward force on the key. The relatively large upward force applied by the spring increases the actuation force the user must apply to the key to activate switch 130, and the relatively small upward force applied by the spring decreases the actuation force the user must apply to the key to activate switch 130. The slider is shown as being accessible to the user through the bottom housing of the mouse, however, various dial, cam mechanisms or the like might be coupled to the slider to slide the slider forward and back. Alternatively, slider 170 may be coupled to a user-accessible, automated control mechanism electrically coupled to switch 130, such as a motor or a solenoid.

Figure 6:
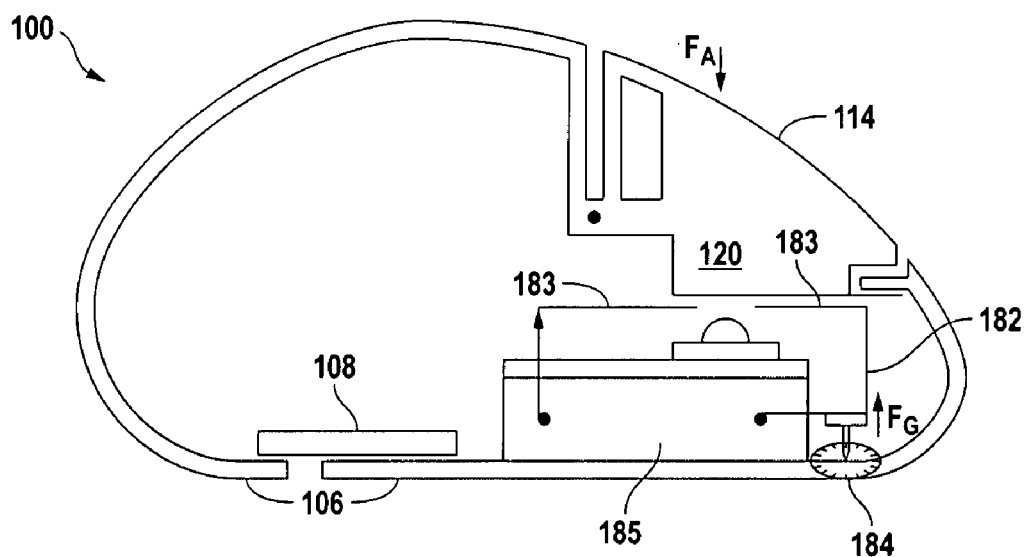
FIG. 6 is a simplified cross-sectional view of a mouse according to another embedment of the present invention.

FIG. 6 is a simplified cross-sectional view of a mouse according to another embedment of the present invention. The mouse includes an actuation force adjustment system 182 that includes a pair of springs 183 that are disposed beneath actuator 120. The springs are configured to contact the sides of the actuator to provide an actuation force as the key is pressed by the user. As the springs are pressed downward via the user pressing the key downward, switch 130 is configured to be activated. According to one embodiment, the springs may be pressed upward by a cam 184 or the like to change the height of the top portion of the springs to in turn change the distance between the springs and the actuator. If the springs are moved up, the actuation force required to activate the switch is relatively high, and if the springs are moved down, the actuation force required to activate the switch is relatively lower. The bottom portion of the spring may be coupled to a mount 185 that holds springs. Cam 184 may be accessible though the bottom housing of the mouse such that the user can turn the cam to adjust the springs and the actuation force of the key.

Figure 7:
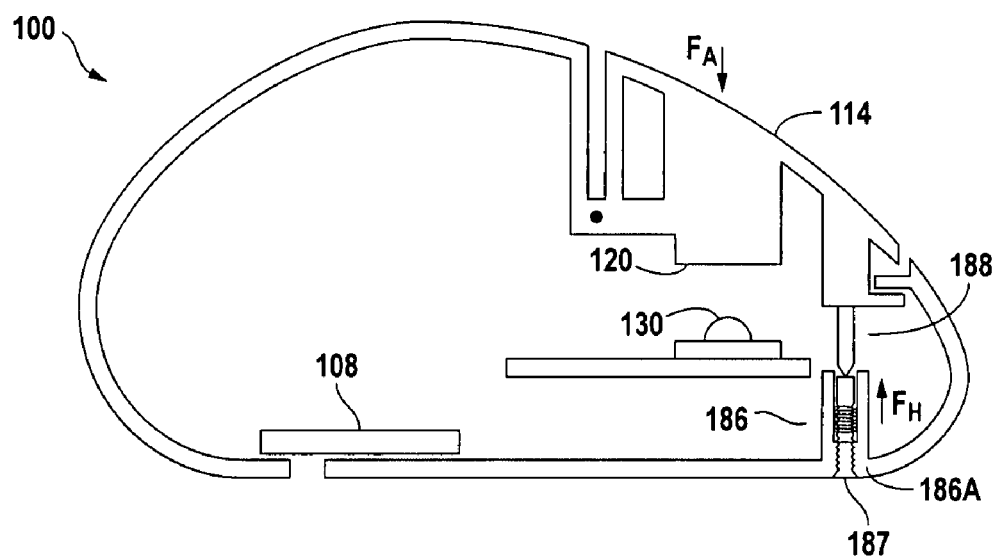
FIG. 7 is a simplified cross-sectional view of a mouse according to another embodiment of the invention.

FIG. 7 is a simplified cross-sectional view of a mouse according to another embodiment of the invention. The mouse includes a damping brake 186. The pin is configured to contact the damping brake as the key is pressed and the damping break is configured to apply the damping force as the pin is presses in the damping break. The damping break may include a rubber type disk 186a or the like that is configured to slide against the wall of the damping break to provide the damping force. The damping break may include a screw device 187 coupled disk to adjust the damping force applied by the damping break to a pin 188. The screw device may be configured to squeeze the disk outward to increase the force applied to the walls by the disk.

Figure 8A:
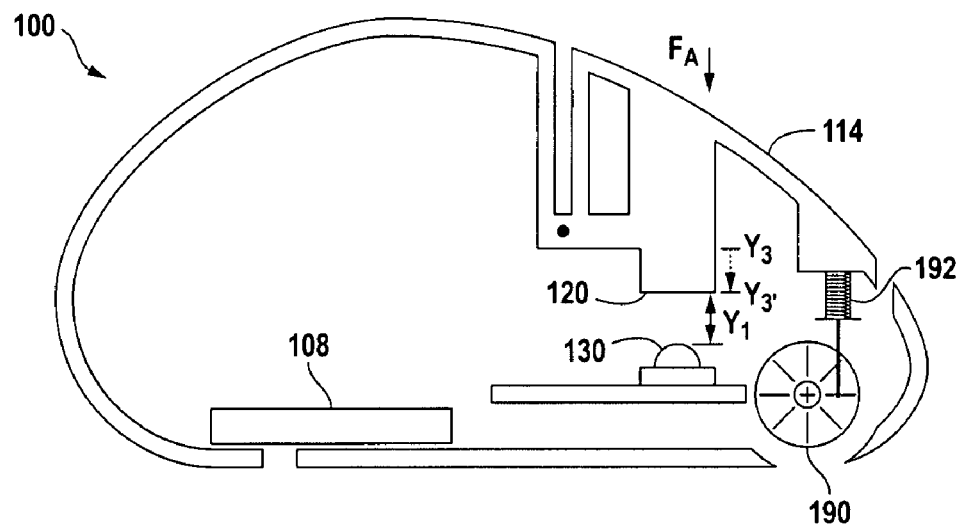
FIG. 8A is a simplified cross-sectional view of a mouse according to another embodiment of the invention.

FIG. 8A is a simplified cross-sectional view of a mouse according to another embodiment of the invention. The mouse includes a key 114 that is couple to a spring 192 that may be compressed or extended by a user rotatable disk 190 that is coupled to the spring. The disk may be accessible to the user through an aperture formed in the bottom housing of the mouse, and may be configured to be rotated by a user to compress or extend the spring to change the actuation force of the key.

Figure 8B:
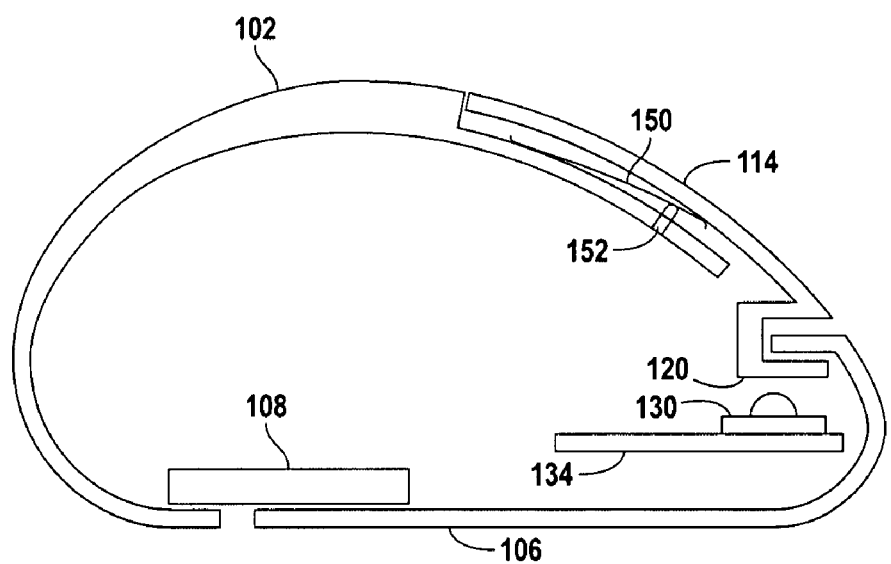
FIG. 8B is a simplified cross section of a mouse according to another embodiment of the present invention.

FIG. 8B is a simplified cross section of a mouse according to another embodiment of the present invention. The top housing 102 of mouse extend under key 112 and includes a spring 150, such as a leaf spring, that couples the top housing and the key. The spring is tensioned to pull the key down. The mouse might includes a screw device 152 coupled to the spring to change the force the spring exerts on the key to increase or decrease the actuation force. As shown the screw device is accessible from the under side of the top housing and may be accessible by a variety of means, such as separation of the top housing from the bottom housing, removal of a battery door or the like. According to an alternatively embodiment, the screw device may be accessible through the top housing.

II. Tunable Travel

Figure 9:
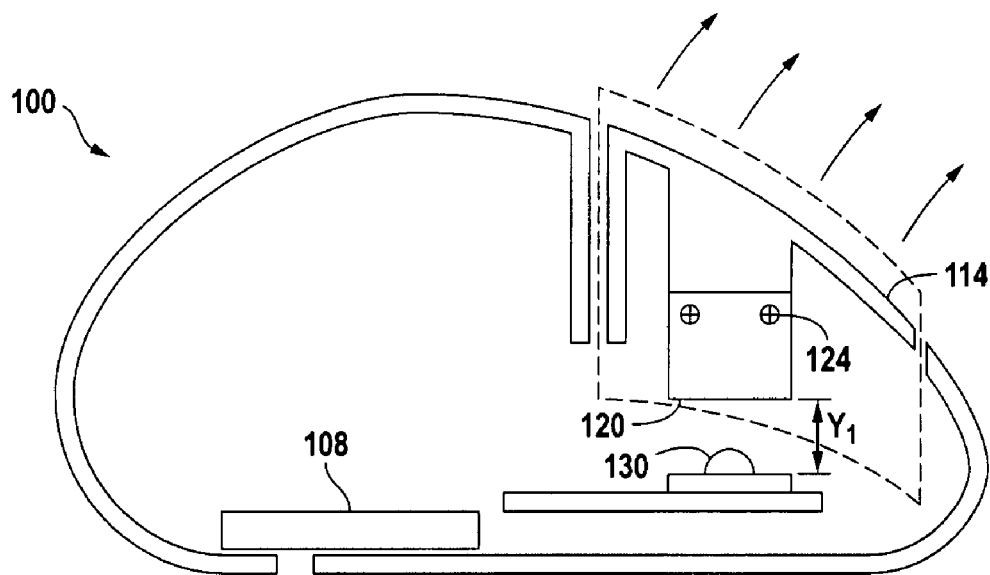
FIG. 9 is a simplified cross-sectional view of a mouse according to another embodiment of the present invention.

FIG. 9 is a simplified cross-sectional view of a mouse according to another embodiment of the present invention. The mouse includes a key 114 that is removable from the top housing. The key may include a detachable actuator 120. The actuator may be replaced with an actuator of a different length to change the height the key must be pressed to activate switch 130. Alternatively, another key having a different length actuator may replace key 114 to change the height the other key must pressed to activate switch 130

Figure 10:
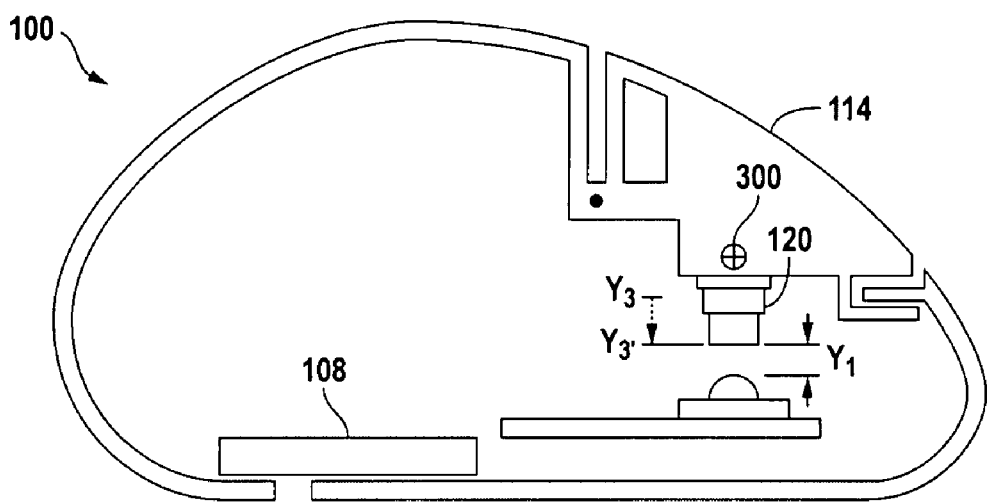
FIG. 10 is a simplified cross-sectional view of a mouse according to another embodiment of the present invention.

According to another mouse embodiment of the invention as shown in FIG. 10, the height of actuator 120 may be adjusted up or down, for example, by a screw device 300. The screw may be made accessible via an aperture formed in the mouse body, or the top and bottom housings may be detachable such that the screw device may be accessed for actuator adjustment. While the actuator is described as being coupled to a screw device to adjust the height of the actuator, the adjustment device for adjusting the height of the actuator might include a rack and pinion, cam, solenoid, DC motor or the like.

Figure 11:
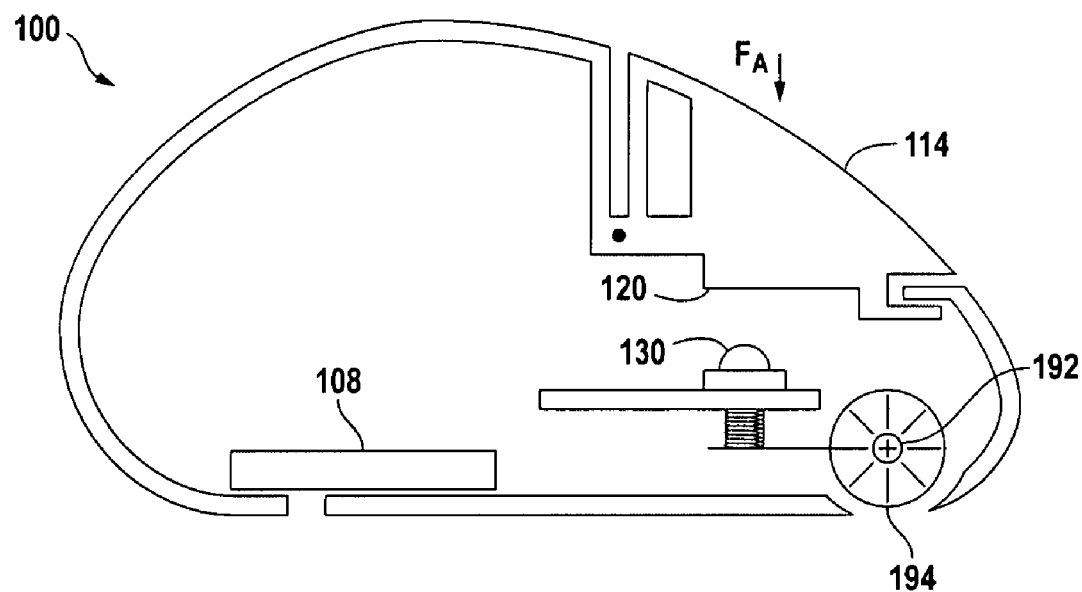
FIG. 11 is a simplified cross-sectional view of a mouse according to another embodiment of the present invention.

FIG. 11 is a simplified cross-sectional view of a mouse according to another embodiment of the invention. The mouse includes a beam 192 that is configured to raise and lower switch 130 and/or the PC board to which the switch is attached. Beam 192 may be coupled to a wheel device 194 that might be a cam and that is configured to raise and lower the beam to in turn raise and lower switch 130. Raising and lowering switch 130 provides that the distance the key needs to be pressed may be set to a height that is convenient for the user. The wheel device may be user accessible through the bottom housing of the mouse.

Figure 12:
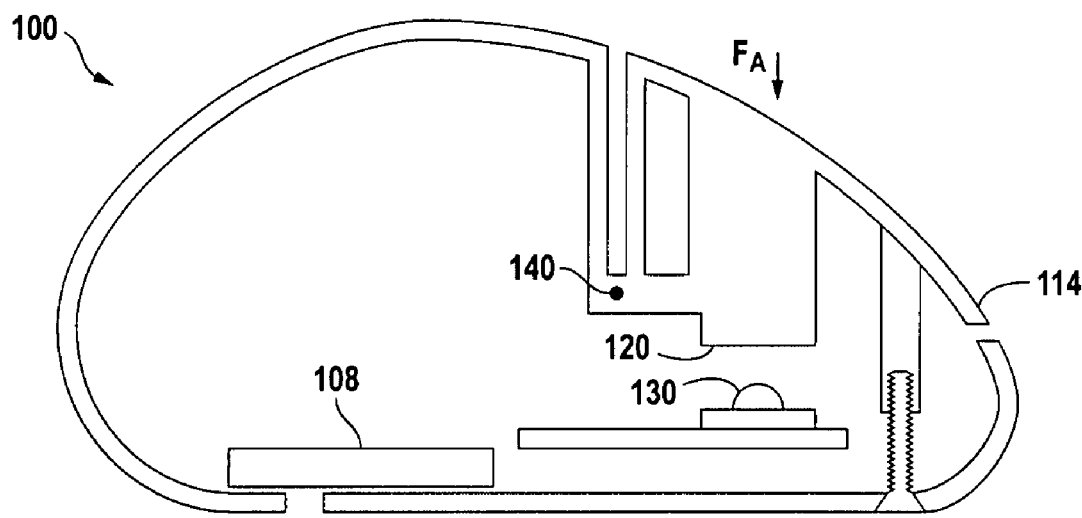
FIG. 12 is a simplified cross-sectional view of a mouse according to another embodiment of the present invention.

FIG. 12 is a cross-sectional view of a mouse according to another embodiment of the invention. The mouse includes a screw type device 215 that is configured to bias key 114 upward or downward to change the distance the key needs to be pressed to activate switch 130.

Figure 13:
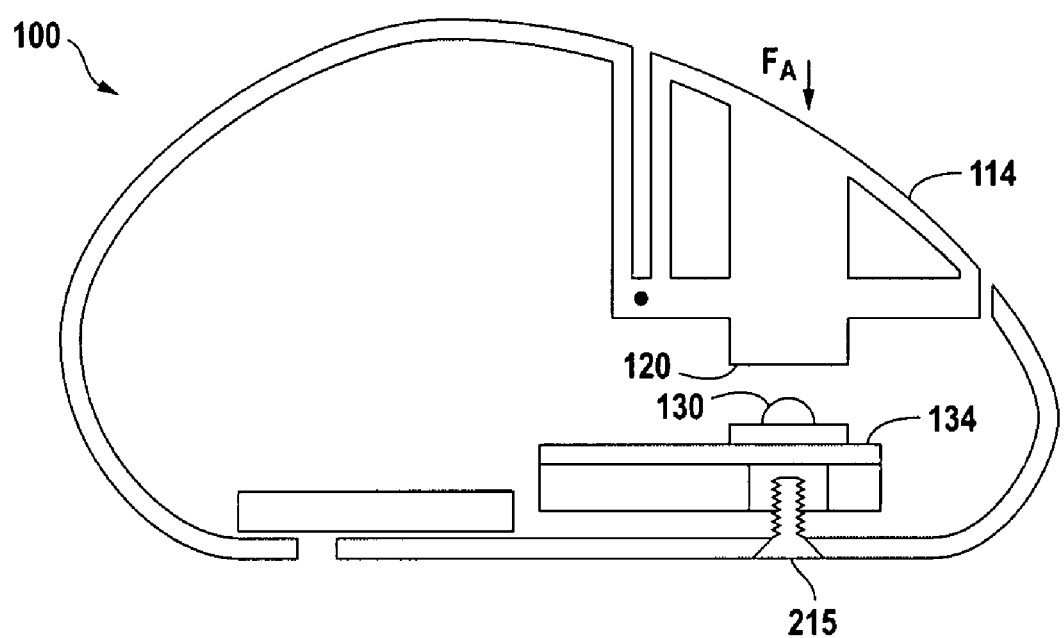
FIG. 13 is a simplified cross-sectional view of a mouse according to another embodiment of the present invention.

FIG. 13 is a simplified cross-sectional view of a mouse according to another embodiment of the invention. The mouse includes a screw device 215 coupled to PC board 134 and is configured to raise and lower the PC board and switch 130 coupled thereto to change the distance the key must travel to activate the switch.

Figure 14A:
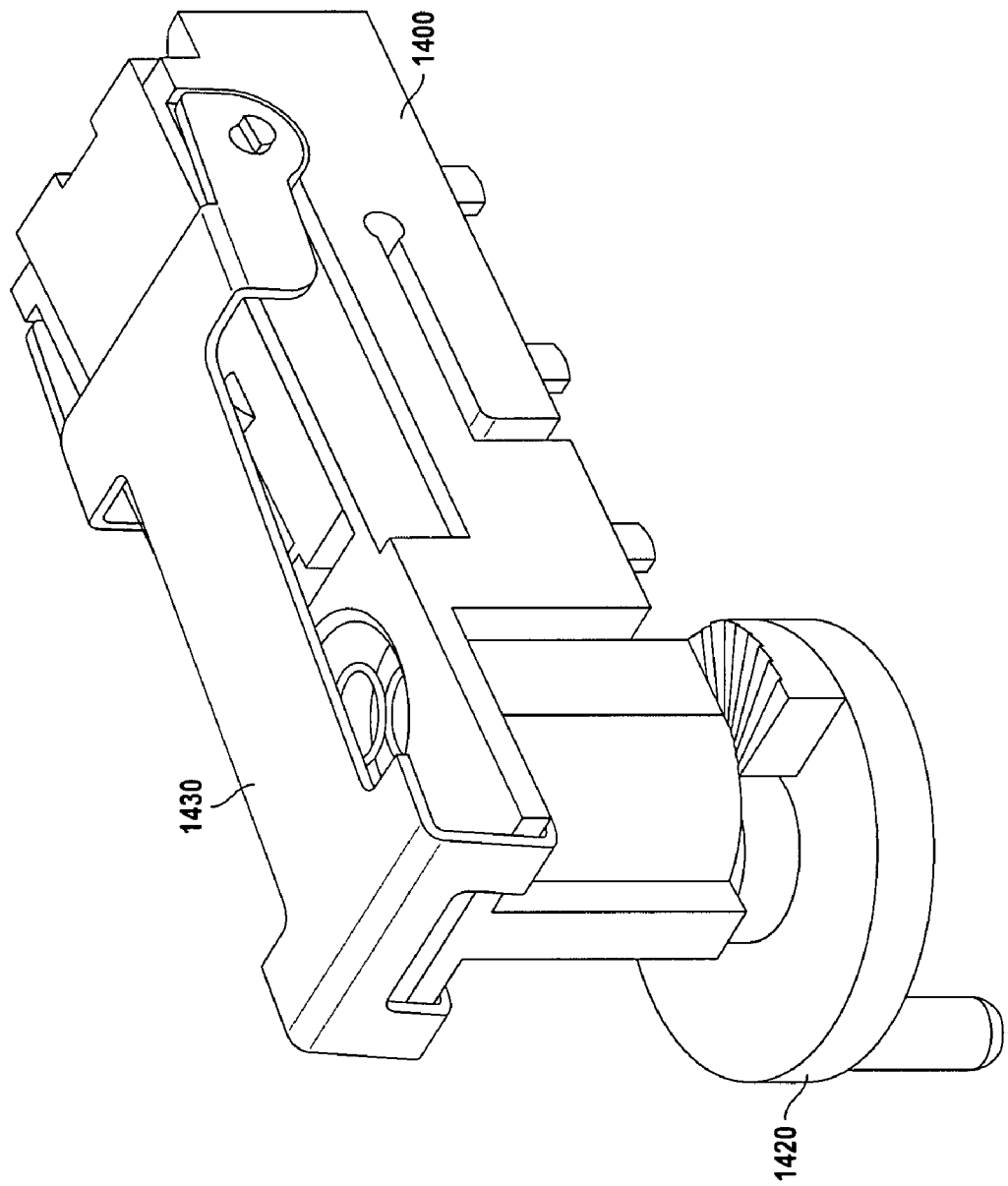
FIGS. 14A-14C are simplified views of an adjustable spring mechanism that may be used to adjust the activation force and/or travel length of a key for key activation.
Figure 14B:
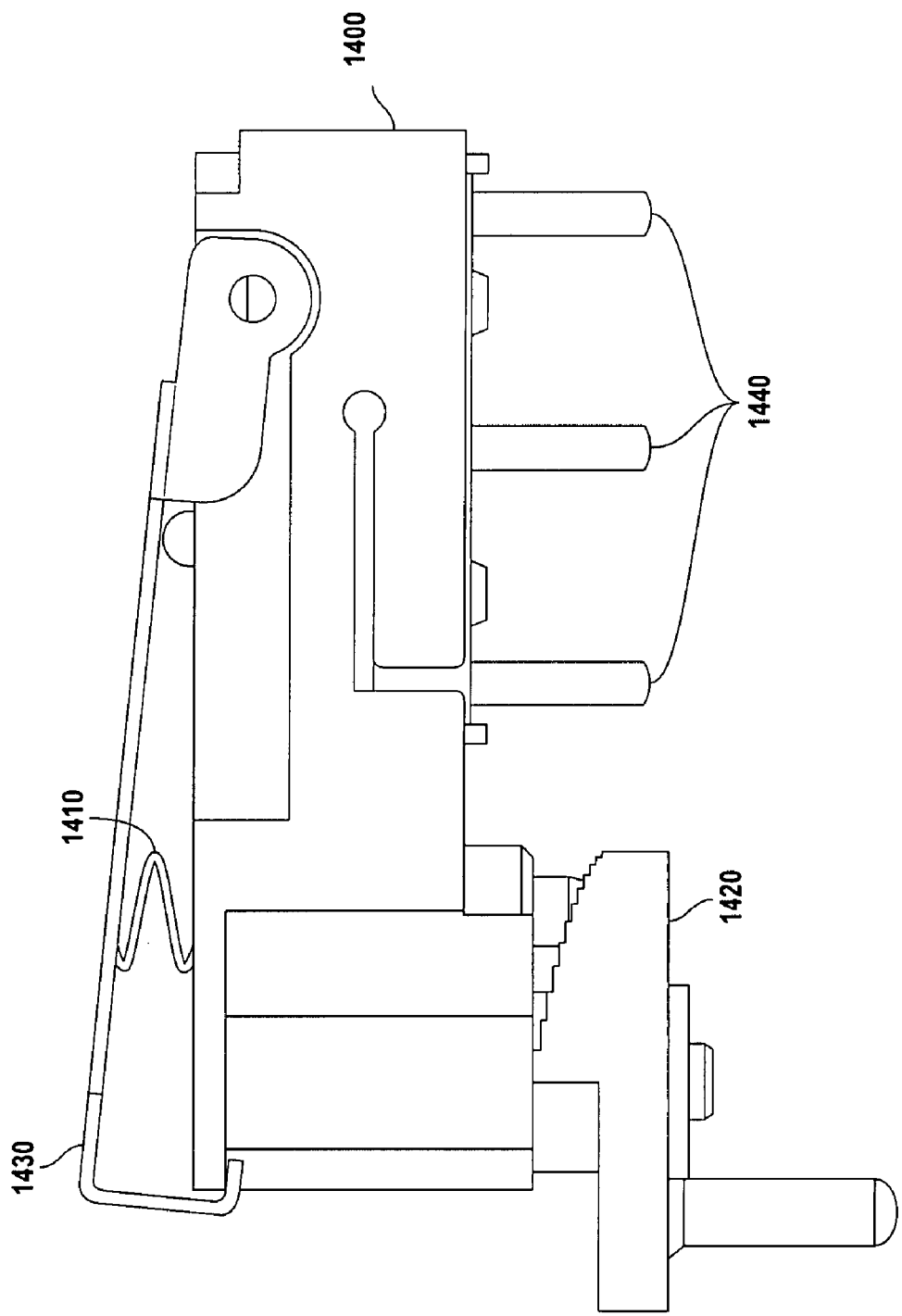
Figure 14C:
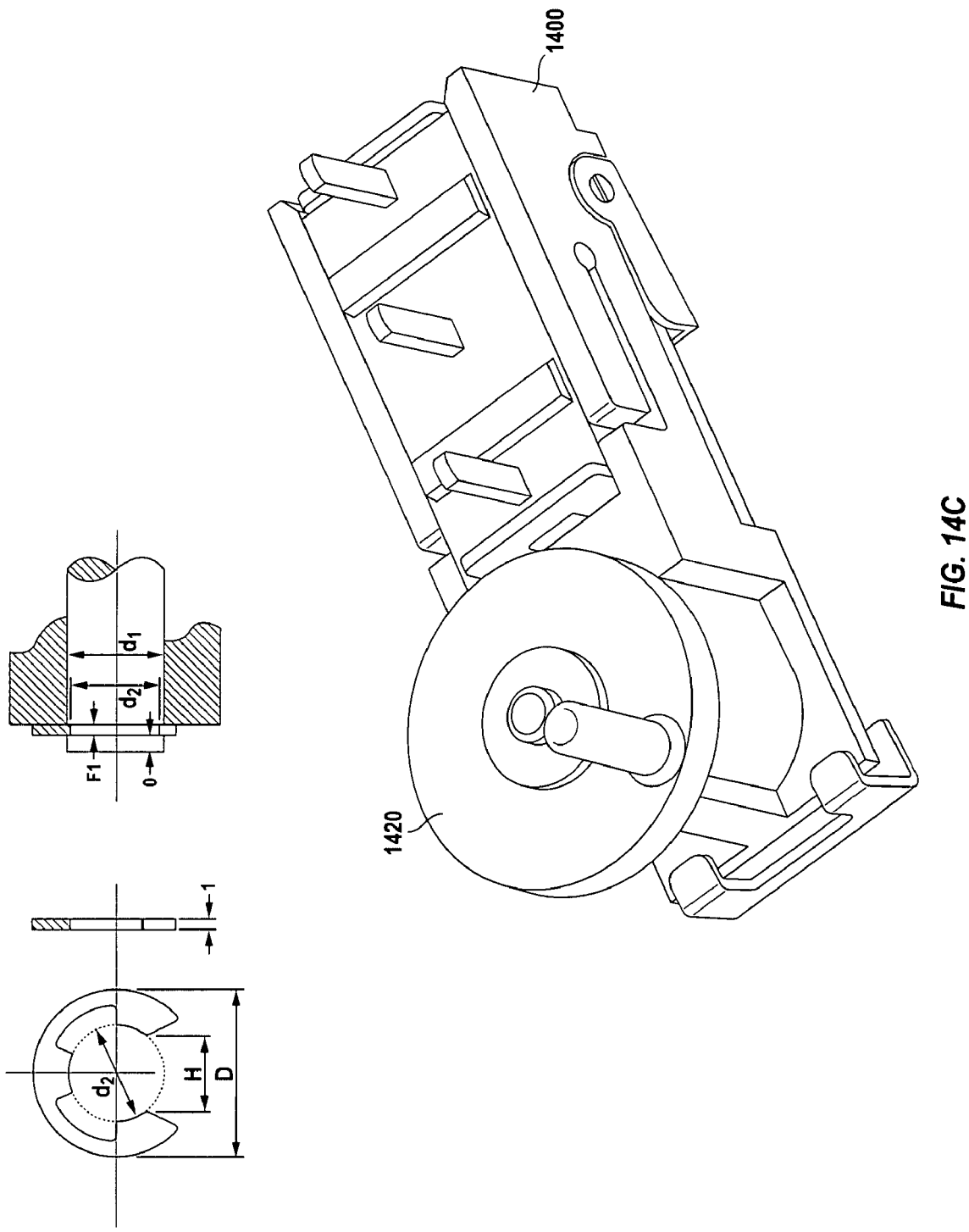

The above-described arrangements are merely illustrative of applications of the principles of this invention and many other embodiments and modifications may be made without departing from the spirit and scope of the invention as defined in the claims. For example, the spring mechanisms described herein above for adjusting the travel and/or force required to depress and/or activate a button may be one of the spring mechanisms developed and manufactured by Omron Corporation of Japan and shown in FIGS. 14A-14C. The spring mechanism includes a housing 1400 that includes a spring 1410 disposed therein and includes a rotary dial 1420 having a stepped shape for placing a larger or smaller force on the spring based on the rotary position of the rotary dial. Spring 1410 is coupled to a lever 1430 that may be coupled to a key of a mouse or the like to change the activation force and/or travel of the key for activation of the key. The spring mechanism may include a number of electrical contracts 1440 that indicate that the lever has been pressed down by a key. The scope of the invention should, therefore, be determined not with reference to the above description, but instead should be determined with reference to the appended claims along with their full scope of equivalents.

What is claimed is:

1. A control device for use on a working surface comprising:
    a bottom housing configured to be placed on the working surface;
    a top housing coupled with the bottom housing, the top housing including at least one key;
    an actuator disposed between the bottom housing and the top housing and coupled with the key;
    a switch disposed between the bottom housing and the top housing, wherein the switch is activated via the actuator traveling a first distance to engage the switch; and
    an adjustment means configured for enabling a user to adjust the distance between the actuator and the switch, wherein the switch is activated via the actuator traveling a second distance and not the first distance to engage the switch if the adjustment means is adjusted, and the second distance is not equal to the first distance.

2. The control device of claim 1, wherein the adjustment means includes a screw type device coupled with the switch that raises or lowers the switch.

3. The control device of claim 1, wherein the adjustment means includes a screw type device coupled with the actuator that raises or lowers the actuator.

4. The control device of claim 1, wherein the adjustment means includes a cam configured to raise or lower the actuator.

5. The control device of claim 1, wherein the adjustment means includes a cam configured to raise or lower the switch.

6. The control device of claim 1, wherein the adjustment means is a cam coupled with a device having a plurality of settings associated with a plurality of distances between the actuator and the switch, wherein the device may be turned by the user.

* * * * *